(12) United States Patent
Fairs (10) Patent No.: US 11,050,833 B2
(45) Date of Patent: Jun. 29, 2021

(54) SYSTEM AND METHOD TO CREATE INDEPENDENTLY MULTI-LAYERED VIRTUAL WORKSPACE APPLICATIONS, DESIGNED FOR USE WITH INDEPENDENT MULTIPLE INPUT SYSTEMS

(71) Applicant: IMI Innovations, Inc., Naperville, IL (US)

(72) Inventor: James R Fairs, Naperville, IL (US)

(73) Assignee: IMI Innovations Inc., Naperville, IL (US)

( * ) Notice: Subject to any disclaimer, the term of this patent is extended or adjusted under 35 U.S.C. 154(b) by 0 days.

(21) Appl. No.: 16/404,666

(22) Filed: May 6, 2019

(65) Prior Publication Data
US 2021/0144214 A1    May 13, 2021

(51) Int. Cl.
*H04L 29/08*    (2006.01)
*H04L 12/58*    (2006.01)

(52) U.S. Cl.
CPC ............ *H04L 67/142* (2013.01); *H04L 51/06* (2013.01); *H04L 67/101* (2013.01); *H04L 67/1008* (2013.01); *H04L 67/1012* (2013.01); *H04L 67/147* (2013.01)

(58) Field of Classification Search
None
See application file for complete search history.

(56) References Cited

U.S. PATENT DOCUMENTS

| | | | |
|---|---|---|---|
| 8,910,057 B2 * | 12/2014 | Hornback, Jr. | G09G 5/363 715/753 |
| 9,065,874 B2 * | 6/2015 | Moyers | H04L 67/1059 |
| 10,474,416 B1 * | 11/2019 | Farivar | G06F 3/0483 |

(Continued)

*Primary Examiner* — Mohamed Ibrahim
(74) *Attorney, Agent, or Firm* — Patent Ventures, LLC (57) ABSTRACT

Embodiments disclosed include systems and methods to create independently multi-layered virtual workspace applications, designed for use with independent multiple input systems. Embodiments disclosed include computer implemented methods and systems comprising sending messages into a computer system via at least one of raw input, operating system coding and application specific messaging. Systems and methods disclosed enable receiving and parsing low level messages by unique listening applications, wherein the unique listening applications are further caused to parse the incoming messages into independently handled and rendered independent multiple input data streams. The unique listening applications are comprised in separate distinct layers corresponding to distinct user functionalities, and enable non co-located users to co-locate within the unique listening applications, facilitate user defined navigation between the separate distinct layers to be configured and activated and deactivated by each individual user, such that each configuration and activation is specific to the individual user. The configuration further comprises moving, hiding and resizing each of the separate distinct layers by each individual user and providing an option to each of the users to grant access to at least one of an application, tool, or file on said users' desktop by at least one other user, wherein the layers are logged by a server to render a configuration or content logged at any previous time upon at least one user rejoining any given session.

14 Claims, 8 Drawing Sheets

(56) References Cited

U.S. PATENT DOCUMENTS

2014/0040360 A1\* 2/2014 Privat .................. G06F 3/1423
 709/204
2014/0317532 A1\* 10/2014 Ma ........................ H04N 7/152
 715/753
2018/0336373 A1\* 11/2018 Deenadayal ............ G06T 5/002

\* cited by examiner

SYSTEM AND METHOD TO CREATE INDEPENDENTLY MULTI-LAYERED VIRTUAL WORKSPACE APPLICATIONS, DESIGNED FOR USE WITH INDEPENDENT MULTIPLE INPUT SYSTEMS

CROSS REFERENCE TO RELATED APPLICATIONS

This application is a continuation in part to U.S. patent application Ser. No. 13/346,669, which claims priority to U.S. Provisional Patent Application No. 61/430,860, entitled "System and Method for Implementing Multiple and Simultaneous Functions Across Multiple Applications" filed on Jan. 7, 2011. Said application is incorporated herein by reference in its entirety.

BACKGROUND

Field

This invention relates generally to real time, simultaneous multiple data stream input within computer applications, and more specifically to systems and methods for the simultaneous manipulation of independent user-interface objects within a computer and/or across a network.

Related Art

Various technologies exist for viewing and controlling user-interface elements for application sharing, control or collaboration. A common example of such an application being network collaboration and presentation technologies. Conventional network collaboration and presentation technologies rely on what is called "screen sharing", which allows remotely connected users using one or more computing devices to view the contents of the screen of a single host computing device in real time. Some of these collaboration, remote desktop, or "webinar" tools will allow a single local or remote user to take control of the user interface on the computer which is sharing its screen, while others allow switching the transmitted display to the user-interface (UI) of another, single, connected host computing device. However, none allow simultaneous manipulation of user-interface elements by multiple users on multiple nodes.

Such methods have several problems. First, because an image of an entire screen is being transmitted to the remote nodes from a host, data transmission rates from the host to the client devices are comparatively high. If the available network bandwidth between nodes is insufficient for such large amounts of data, lag in the display image, and dropped or distorted images, can create severe usability problems, and a degraded user experience. Further, such large amounts of data can degrade the processing ability of both the host and the client devices, reducing the ability to perform other tasks. Another problem with such technology is that only one user is in control at any given time. If another user needs to control the UI on the host device, control of the host UI must be relinquished exclusively to the client. Likewise, in traditional screen sharing applications, if a client wishes to become a host, showing what is on their screen, view of the original host and control by the original host's user would be lost.

Accordingly, there is need for a system and method that allows for the remote manipulation of user interface objects on a remote computer without the need to transmit large amounts of data, as does screen sharing, and is capable of manipulating multiple UI elements across a plurality of nodes. Further, for true, simultaneous, collaboration, users need to be able to act simultaneously and freely with respect to UI elements.

SUMMARY

Herein are disclosed systems and methods for implementing multiple and simultaneous functions across multiple applications. The system comprises a first computing device capable of accepting input (including, but not limited to, personal computers, servers, portable wireless devices, cellular phones, smart phones, PDAs, video game systems, tablets, or other specialized devices); in one embodiment, one or more input device (including, but not limited to, a mouse, joystick, track ball, track pad, touch screen, pen, stylus, motion sensor, video camera, magnetometer, accelerometer, GPS, or other sensing device); in an alternative embodiment, input may be provided by software, firmware, sensor or other automated device; input device interface; input aware software; a first user-interface object; a first software application for monitoring independent multiple user-interface objects and elements for data modification; a first network interface; a first sending and receiving software application for transferring data modification information across the network interface in one embodiment, or within the same computer in another embodiment; a data network (including but not limited to, Ethernet, LAN, WAN, Wi-Fi, cellular, fiber optic, USB, IEEE 1394, IEEE 802, infrared, laser, Blue Tooth, etc.) for sending and receiving data modification information synchronously or asynchronously; a second computing device; a second network interface; a second sending and receiving software application for sending or receiving data modification information synchronously or asynchronously; a second user-interface object; said second sending and receiving software application replicating the changes in the data modification information for the second user interface object, also affecting the control of application. While the above embodiment of the present invention depicts software capable of both sending and receiving, in alternative embodiments software applications can be send only, receive only, or both. In yet another embodiment a server can reside between two or more sending and/or receiving computing devices. Said server may be, but is not limited to, acting to facilitate communication, routing, Quality of Service, data flow management, load balancing, or provide shared resources. Alternatively, a plurality of computing devices may communicate in a peer-to-peer network of nodes or a network cloud.

A computer-implemented method for implementing multiple and simultaneous functions across multiple applications, wherein software application on a first computing device monitors independent multiple user-interface objects and/or elements for data modification, transfers said data modification information to a receiving application on a second computing device, wherein said second computing device replicates the changes on the first computing device in the corresponding user-interface object on said second computing device. Said method comprising the steps of: monitoring multiple user interface objects and elements for data modification on a first computing device; transferring said data modification information to a sending and receiving application; receiving data modification information by a second computing device; replicating data modification information on corresponding user-interface elements on a second computing device.

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a processor. The processor also includes a non-transitory storage medium coupled to the processor. Encoded instructions, stored in the non-transitory storage medium, and which when executed by the processor, causes the processor to introduce messages into the computer system via at least one of raw input, operating system coding, and application specific messaging. Further the system is configured to receive and parse low level messages by a unique listening application, where the unique listening application is further caused to parse the incoming messages into independently handled and rendered independent multiple input data streams. The unique listening application is included in separate distinct layers corresponding to distinct user functionalities. The system is caused to enable non co-located users to co-locate within the unique listening application, which includes acquiring via the listening application, simultaneous users via a networked server, and to facilitate user defined navigation between the separate distinct layers. Additionally, the system facilitates each of the separate distinct layers to be configured by each individual user. Other embodiments of this aspect include corresponding computer systems, apparatus, and computer programs recorded on one or more computer storage devices, each configured to perform the actions of the methods.

One general aspect includes a computer implemented method comprising, sending messages into a computer system via at least one of raw input, operating system coding and application specific messaging. The method comprises receiving and parsing low level messages by a unique listening application, and parsing the incoming messages into independently handled and rendered independent multiple input data streams. The unique listening application is included in separate distinct layers corresponding to distinct user functionalities. The computer implemented method further comprises enabling non co-located users to co-locate within the unique listening application, which enabling includes acquiring via the listening application, simultaneous users via a networked server. Further the method includes facilitating user defined navigation between the separate distinct layers, and facilitating configuration of each of the separate distinct layers by each individual user. Other embodiments of this aspect include corresponding computer systems, apparatus, and computer programs recorded on one or more computer storage devices, each configured to perform the actions of the methods.

BRIEF DESCRIPTION OF THE DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings, and system diagrams.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

All computers and networks utilize multi-layered messaging to compute and render results. Raw input is an example for single computers, but in all cases (servers, systems, etc.) there are examples of messaging hierarchies.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It should be noted that "MultiNet" and "MultiNet enabled" are used to describe applications and UI elements which have been given the capability to monitor, detect, send and/or receive, and replicate UI change data on a remote system across multiple independent data streams.

Figure 1:
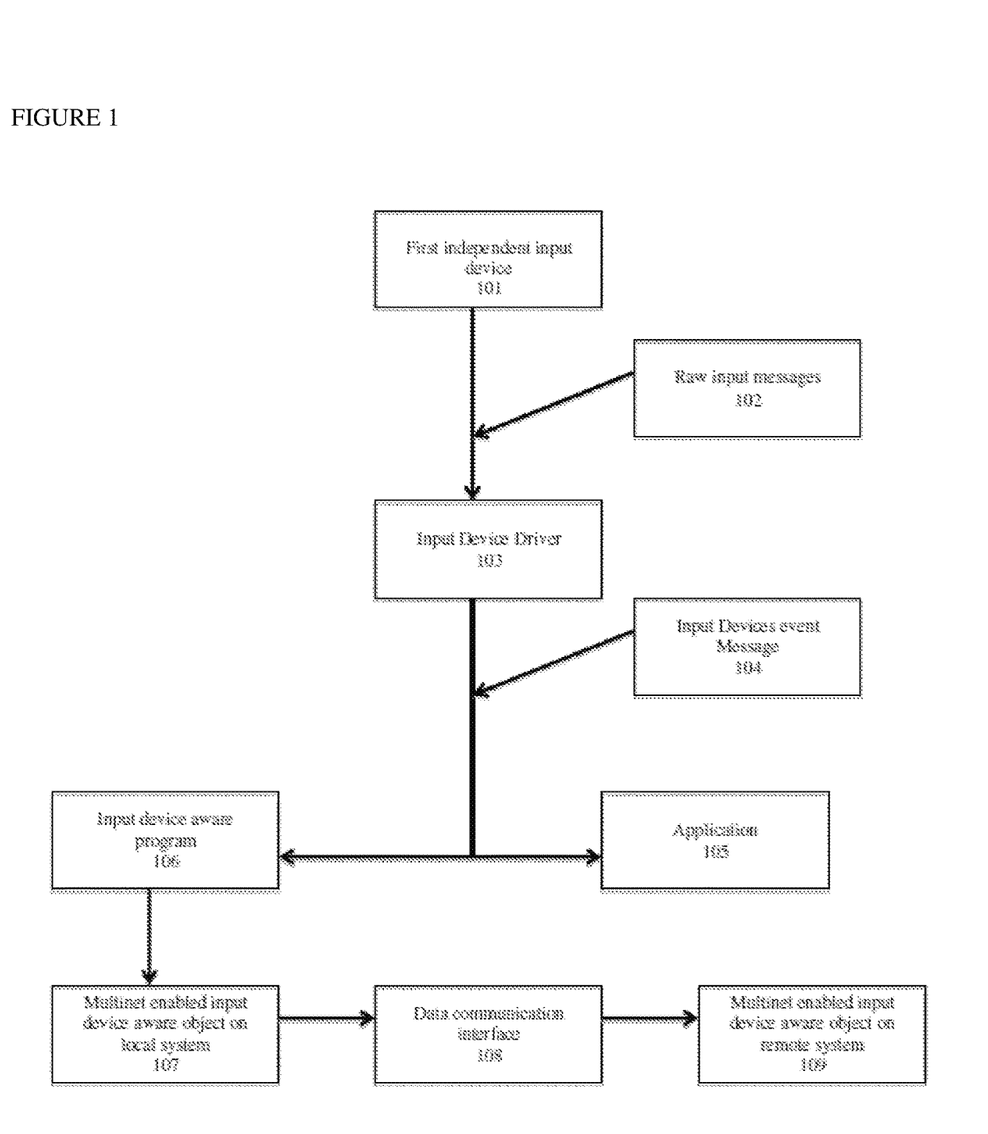
FIG. 1 is a diagram showing data flow from user input device to input aware object on a local system to a second input aware object on a remote system according to one exemplary embodiment of the present invention.

FIG. 1 is a diagram showing data flow from user input device to input aware object on a local system to a second input aware object on a remote system according to one exemplary embodiment of the present invention. As understood herein, the term "input devices" is interpreted and construed broadly to mean any input device or any input functionality, software, hardware, or firmware, which generates continuous or discrete input signal, based on either human manipulation or, in alternative embodiments, automated through software or triggered by sensor data. Examples of such input devices include, but are not limited to, standard mice, modified mice, touch screens, drawing pads, game controllers, touch pads, keyboards, voice driven input systems, joystick, track ball, track pad, touch screen, pen, stylus, motion sensor, video camera, magnetometer, accelerometer, or other sensing device, as well as various firmware, etc. Input devices 101 may be connected to the user interface via wire, IR, wireless, or remotely, such as over the internet, and other means. FIG. 1 shows the flow of data from first input device 101 to MultiNet enabled input device aware object on a local 107 to MultiNet enabled input device aware object on a remote system. It should be noted that while the present example recites "input device aware", such references should be interpreted to mean any input, such as from alternative embodiments of the present invention which use software or other non-device methods, sensors or other automated methods to provide input.

Raw input message 102 is then processed by input devices driver 103. Raw input message generally includes positions of the first independent input devices 101, movements of the multiple independent input devices 101, and states of other multiple independent input devices elements, such as buttons. Input devices driver 103 takes raw input message and converts it to X/Y coordinate data of the input device movements on a plane and states of other device elements. Operating system software also takes raw input message directly from multiple independent input devices 101. Operating system software interacts with input devices driver 103 by sending request to input devices driver 103 for input devices event message 104 and receiving input devices event message from input devices driver 103. Such software may reside on data storage devices such as RAM, ROM, hard disk, flash memory, or network or cloud based data storage. Preferably, input devices driver 103 comprises standard system input devices driver, and/or specialized/modified input devices driver. Examples of input devices driver 103 include, but are not limited to, system mouse driver, modified mouse driver, touch screen driver, drawing pad driver, game controller driver, touch pad driver, voice driven input system driver, as well as various firmware drivers, etc.

In one embodiment, independent cursors and control points are generated by operating system software together with input devices driver 103, and are fully under control of movements and states of independent input devices 101. As understood herein, the term "cursors and control points" is interpreted and construed broadly to mean any indicator or marker comprising a movable point on visual display. Examples of cursors and control points include, but are not limited to, cursors, control points, or functionalities embedded within an application, wherein such cursors and control points could be either visible, or could be embedded but not rendered in visible forms. Movements of, and changes on, other states of the cursors and control points under the control of input devices allow user to point to commands or screen positions. However, in alternative embodiments, such as those where input originates with software or signals produced by sensing devices, it is envisioned that the present invention can operate without cursors or control points.

Input devices driver 103 sends input devices event message to application 105 or input device aware program 106. As understood herein, the term "application" is interpreted and construed broadly to mean any application software provided by operating system or installed on operating system, or any application connected to operating system, in an embedded system with or without an operating system, or any application on the internet or intranet. Input device aware program 106 is designed for users to exploit the functions of the MultiNet enabled device aware object 107. Input device aware program 106 interprets the input devices event message from input devices driver 103 and controls input device aware objects 107. Input device aware objects 107 are designed to monitor, send receive and replicate change data of input device aware UI objects.

As understood herein, the terms "input device aware objects" and "input aware objects" are interpreted and construed broadly to mean any input control objects such as input devices numeric input boxes, input devices scroll bars, input devices menus, other input aware objects, and numerous spoken voice input device objects.

To programmatically generate input devices event message 104, a pointing devices data interpreter sends a request to execute a mouse operation to input devices driver 103. Input devices driver 103 reads in the data presented by pointing devices data interpreter and converts it to X/Y coordinate data of the multiple input devices movements on a plane and states of other device elements. Upon the request by pointing devices data interpreter to execute a mouse operation, input device driver 103 sends input devices event message back to operating system interface software.

Figure 2:
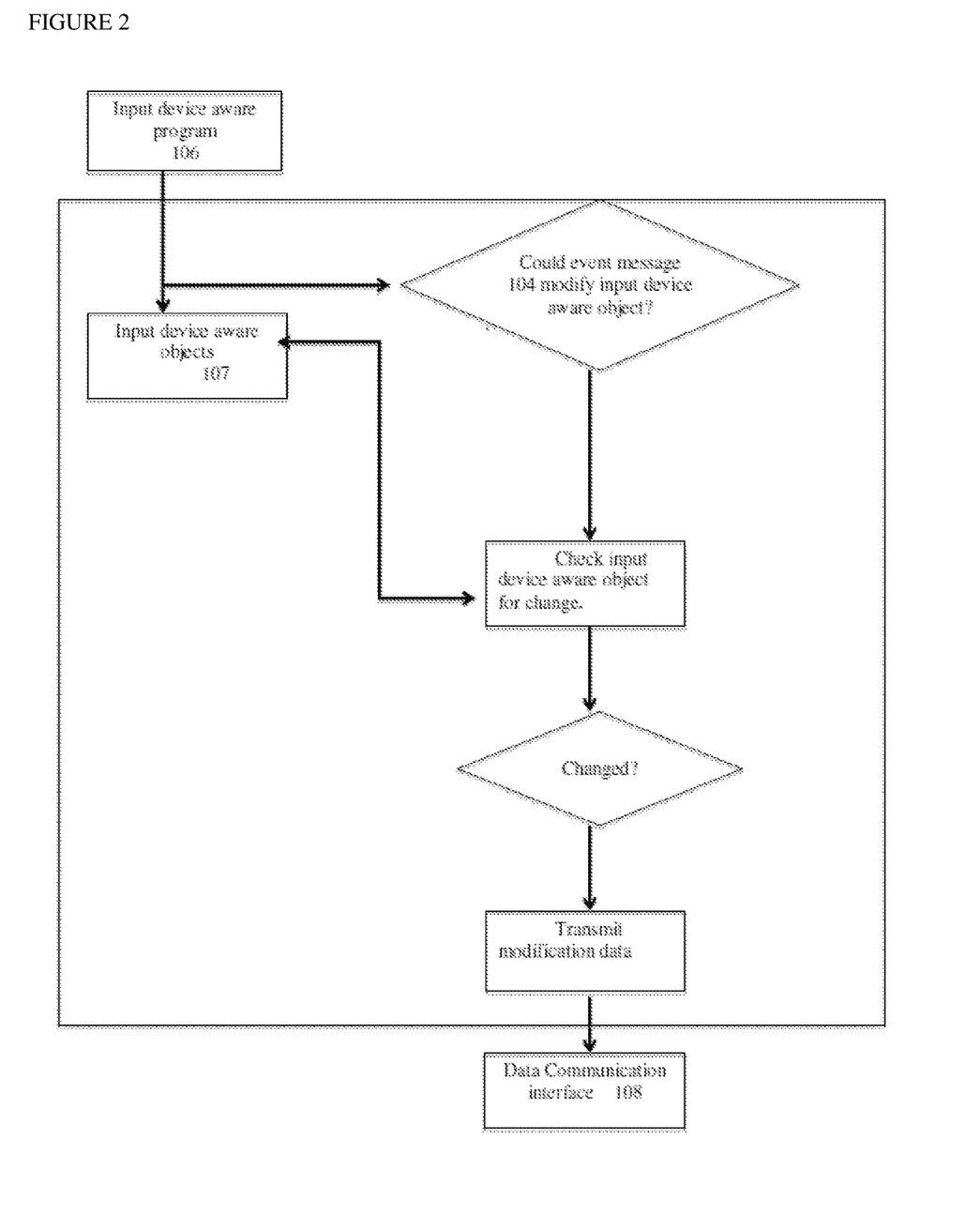
FIG. 2 is a diagram showing a Multi Net enabled input aware user-interface object on a local system.

As illustrated in the embodiment in FIG. 2, input devices event message generated by input devices driver 103 is also received by either input device aware program 106 or application 105. Upon input devices event message, input device aware program 106 controls input device aware objects 107.

FIG. 2 is a diagram showing a MultiNet enabled input device aware user-interface object on a local system. Data enters into an input device aware object 107 (including, but not limited to button, slider, checkbox, etc.). User interface objects are monitored for change. For example, UI elements such as sliders, buttons and check boxes all depict values when in one state or another. When activated by input from a user, automated system or sensor, the value is modified. When data modification is detected, a sending and receiving software application transmits data modification information to a data communication interface 108. Data communication interface could be any type of data transmitting technology for sending and receiving data modification information synchronously or asynchronously, including but not limited to, Ethernet, LAN, WAN, Wi-Fi, cellular, fiber optic, USB, IEEE 1394, IEEE 802, infrared, laser, Blue Tooth, etc.

Figure 3:
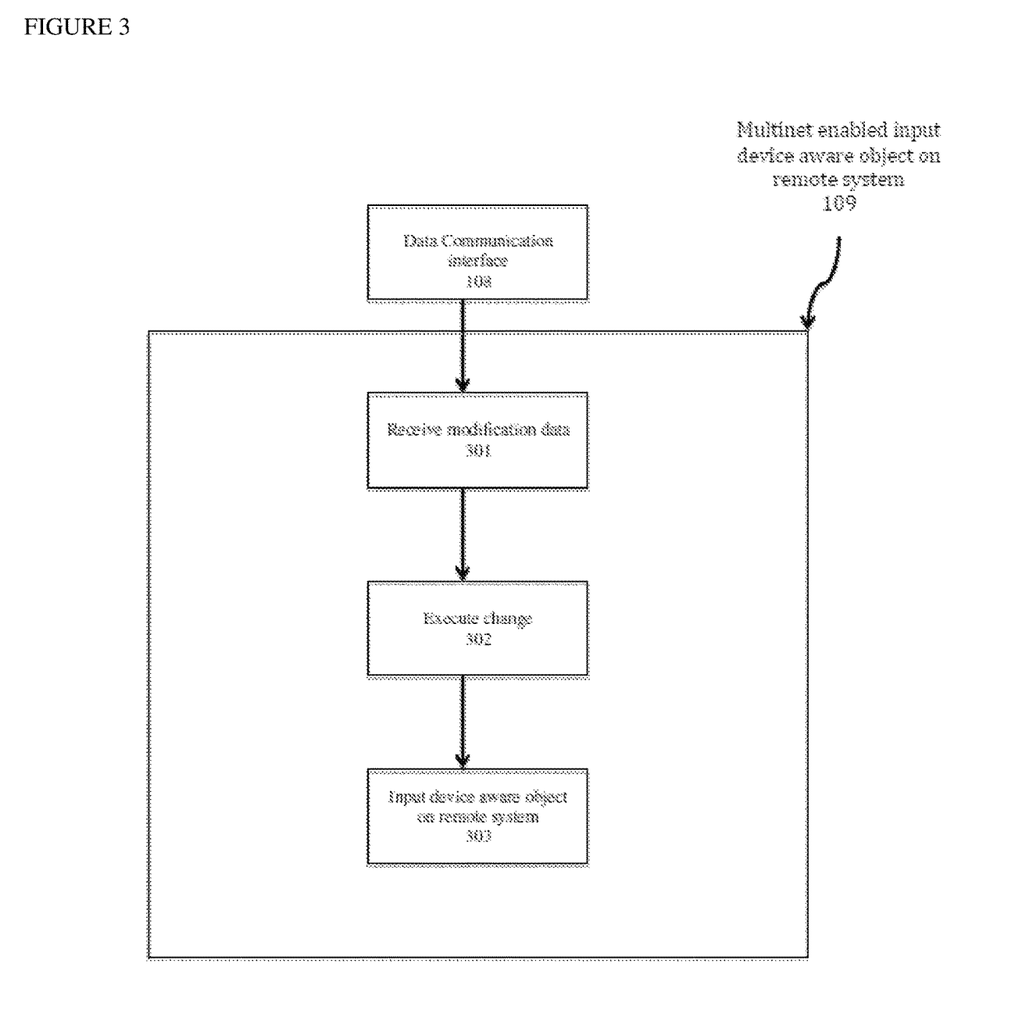
FIG. 3 is a diagram showing a MultiNet aware user-interface object on a remote system according to one exemplary embodiment of the present invention.

FIG. 3 is a diagram showing a MultiNet aware user-interface object on a remote system according to one exemplary embodiment of the present invention. Data modification information being received 301 by input device aware object on remote system 109 from data communication interface 108. The execute change module 302 replicates the data modification information from the local system in the input device aware object on remote system 303.

FIGS. 1-3 depict data modification information traveling in one direction, to the remote computing device. However, in an embodiment of the current invention, the data modification information can be simultaneously moving in the opposite direction, using multiple independent data paths, thereby enabling simultaneous input and simultaneous UI object manipulation. For example, in one embodiment, various forms of digital media can be edited collaboratively using MultiNet enabled applications. In the case of digital video editing, a local user can be using one set of UI controls to apply an audio track to the video, while a remote user adds title and caption information simultaneously and in real time. Co-gesturing can be used to point out or highlight tools to another user. The types of media that can be edited collaboratively includes, but is not limited to, video, text, audio, technical drawings, software development, 3D modeling and manipulation, office productivity tools, digital photographs, and multi-media presentations. In another embodiment, audio mixing can be performed in real time by musicians in remote locations, enabling the means to perform together, live, without having to be in the same location.

Figure 4:
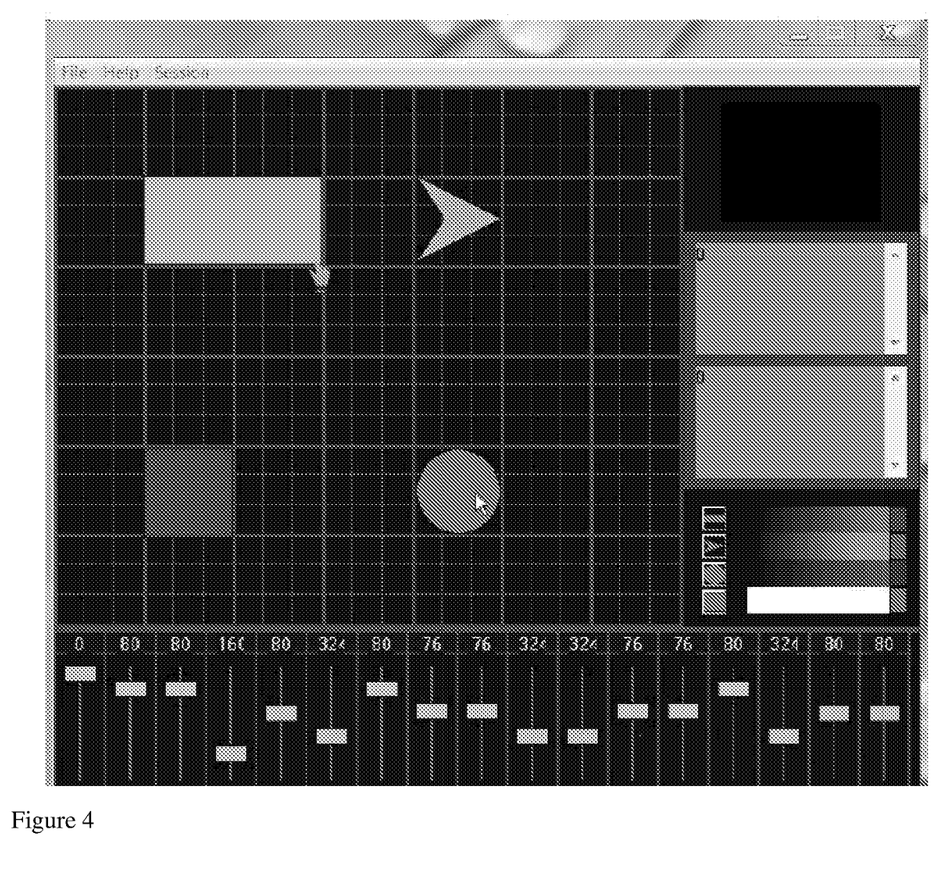
FIG. 4 is an illustration of sample UI elements in a first state on a local system according to one exemplary embodiment of the present invention.
Figure 5:
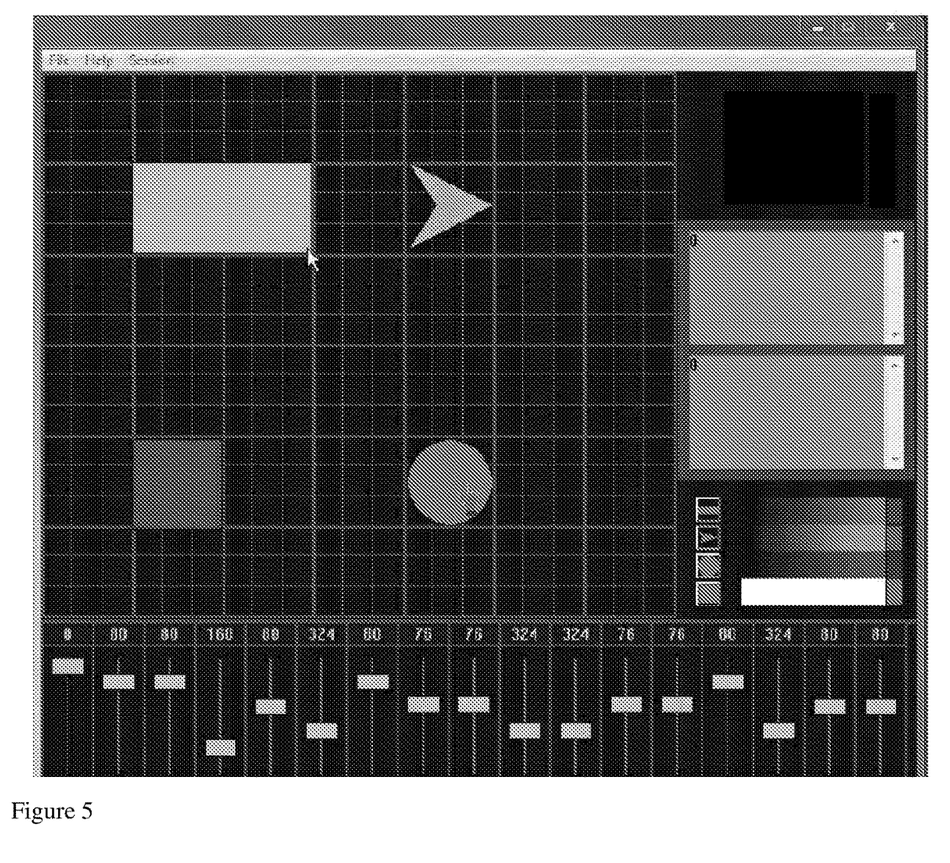
FIG. 5 is an illustration of sample UI elements in a first state on a remote system according to one exemplary embodiment of the present invention.

FIGS. 4-7 depict an example of simultaneous manipulation of user interface elements on two separate computers by two different users. These figures depict a sample software application running on each of Computer 1 and Computer 2. FIG. 4 is a screen shot of Computer 1 in state A. Note that there are two cursor elements, each pointing at a user interface element which is a MultiNet enabled input device aware object. In FIG. 4, the local cursor, which is controlled by a local input device, is depicted as an arrow, and is shown selecting a circle. The second cursor, depicted as a hand, is controlled by a remote user using Computer 2. This second cursor is shown selecting a rectangle. FIG. 5 depicts the view from Computer 2, and shows the cursor types reversed.

Figure 6:
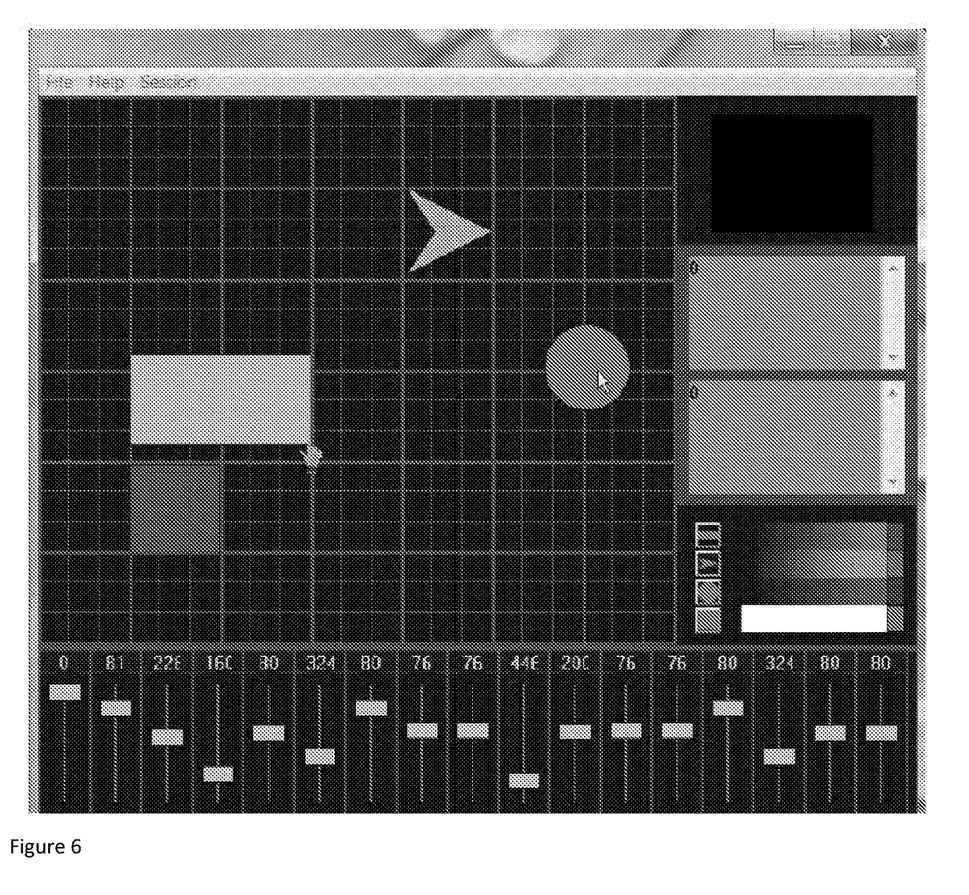
FIG. 6 is an illustration of sample UI elements in a second state on a local system according to one exemplary embodiment of the present invention.
Figure 7:
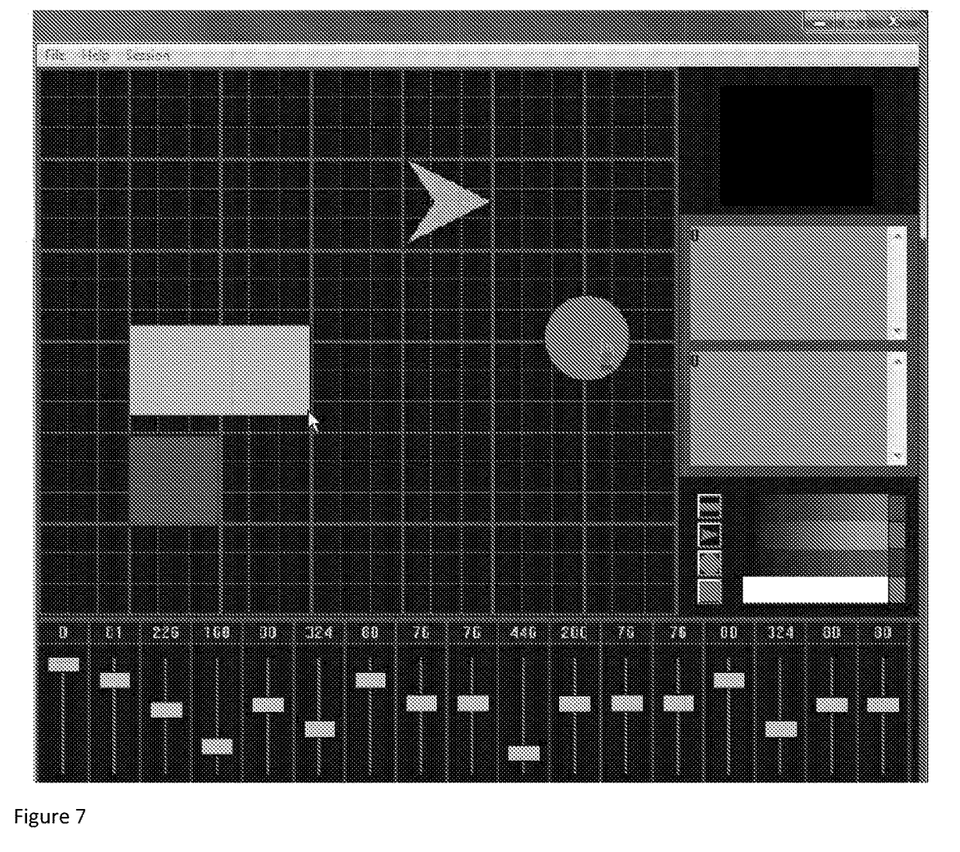
FIG. 7 is an illustration of sample UI elements in a second state on a remote system according to one exemplary embodiment of the present invention.

FIG. 6 depicts Computer 1 in state B. Here, the user of Computer 1 has selected and moved the circle element up and to the right of the screen, while simultaneously, the user of Computer 2 has selected and moved the rectangle down and to the left. Both computers are sending and receiving data modification information simultaneously, without having to send any screen image data or high-volume data transmission.

The sample application depicts two users collaborating within an application running on each system. The present invention however is not limited to two users, and it is anticipated that applications can use any number of independent multiple input data streams to parse any number on input devices independently, to create new, real time user interface environments.

Also, Computers 1 and 2 are depicted as running the same application. This is not a limitation of the present invention. It is envisioned that application types may differ. For example, a local application showing UI elements for control of particular machine functions on a remote server, machine interface, or other computing device may be either a simplified version of the remote UI elements or more complex. The present invention is cross-platform, thereby enabling, in one embodiment, a remote wireless devices to send UI data modification information to a server, computer controlled vehicle or medical device. Further, because only the underlying UI change data or control information is being transmitted, the amount of bandwidth needed to carry the information while preserving its simultaneous, real-time advantages is very small. Therefore, even limited bandwidth devices such as smart phones can take full advantage of the present invention.

Further, it is an aspect if the present invention that in an embodiment such as depicted in FIGS. 4-7, that when one node joins a group already in progress, complete state data of some or all UI elements may be transmitted to the application software on the new node. In such cases and in others, sending complete state data rather than just changes may be desirable.

In still another embodiment, a military application may have multiple soldiers on the ground, each with a computing device node, collaborating to simultaneously control a multi-camera aerial drone. Cameras can be quickly moved to focus on changing circumstances. Again co-gesturing can be used by several users, each using their own remote node, to point out objects or people on the ground, and other UI tools such as highlighting, zooming, light amplification, and infrared imaging can be activated by anyone who may need it instantly and simultaneously.

Embodiments disclosed include computer systems and computer implemented applications that parse input from a variety of systems, always engaging the lowest level wherever and whenever appropriate. Preferred embodiments include application designs that virtualize real time-interactive co-computing experiences in user-customizable virtual workspaces.

Preferred embodiments enable creation of unique environments of independent layer s to which members of work groups can migrate at will to engage with others in a variety of tasks, and in a multitude of ways. Theoretically there might eventually be any number of such layers, and participants will move freely from one layer to another.

Preferred embodiments enable saving of virtual workspace data as a 'Session'. Sessions can be user defined and created, and in some embodiments, saved on the Server level. According to an embodiment, specialized servers enable participant access and log in to sessions. The server parses the imagery, data entry, browsing functions and more, and also acts as the repository of all session data, which includes saved browsing sites, texting, uploaded files, work-product imagery, and more.

To narrow the initial description focus, let's select three layers in an example embodiment:

1) The Core Application Window—This portion is a Browser with application function buttons and links. All events that occur in this and other layers are shared in real-time by all participants. This window opens Drawing, Application Sync, Desktop Sync, Network Sync, File storage, group Chat access, Co-browsing across networks, Saved co-browsing logs, Session Management Controls, and Session Invitation capabilities, along with access to personal meeting logs, Drawing features, File sharing, etc.

2) Interactive Real-time Texting—as a standalone function, accessible to anyone in the 'Session'. Those who have chosen this activity may chose to view only this layer, or to monitor activity in other layers.

While all text is viewable as it is typed, from all participants, each participant also has a 'private notes' area which is not viewable by the group.

If the 'Chat' window is made available to the Session as a whole, it will be captured in images saved to the session as a captured work product.

The 'last up' text is saved to the Session as a starting point for those who join the Session at a later date.

3) 'Sync and Draw' Layers—Users can Sync, or make available to the group, applications on their computers, files from their computers uploaded to the Session, specific Networking (precise networking imagery), all the way to their entire desktops (literally access to their computer). All aspects of Sync Layers can be 'drawn upon', or captured as images.

Users can move freely and independently across these three (core) example layers, as they are drawn to particular aspects of a Session for any reason, be it the subject matter, the nature of the activity, their skill set, or, in fact, they can simply watch the action associated with the endeavor to which they have been invited. New function layers will be added to each particular application design as needed.

Figure 8:
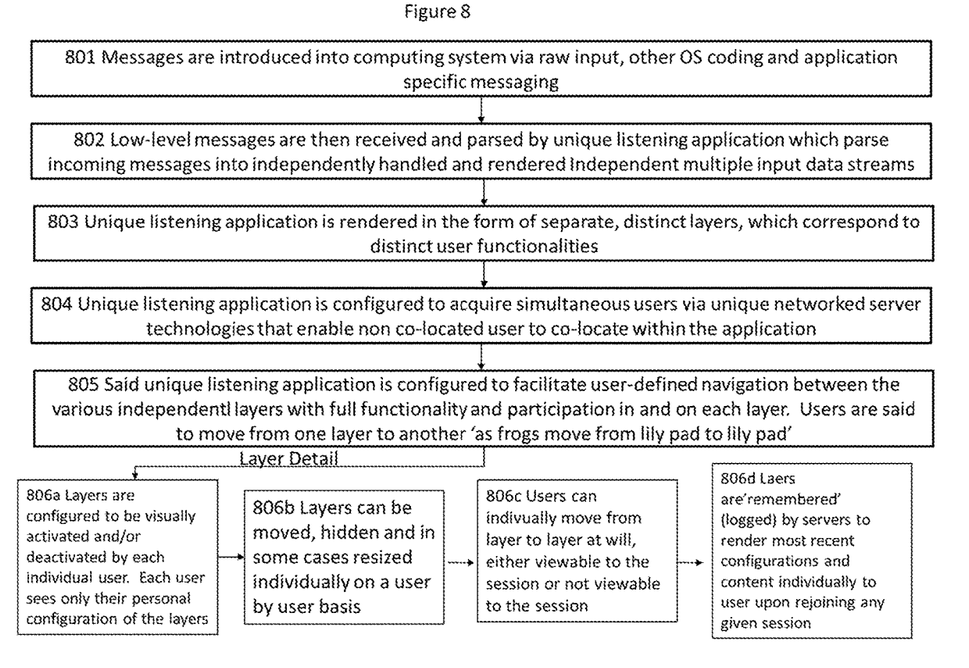
FIG. 8 is a flow chart illustrating the method according to an embodiment.

FIG. 8 is a flow chart illustrating the method according to an embodiment. Step 801 includes introducing messages into computing the system via raw input, other Operating System (OS) coding, or/and application specific messaging. Step 802 includes receiving and parsing low-level messages by a unique listening application, wherein the listening application further parses incoming messages into independently handled and rendered Independent Multiple Input data streams. Step 803 includes rendering the unique listening application or applications in the form of separate, distinct layers, which correspond to distinct user functionalities. Step 804 includes configuring the unique listening application to acquire simultaneous users via unique Networked Server technologies that enable non co-located users to co-locate within the Application. Step 805 includes configuring the unique listening application to facilitate user-defined navigation between the various independent layers, with full functionality and participation in and on each layer. Users are said to move from one layer to another 'as frogs move from lily pad to lily pad'. Step 806a includes configuring the layers to be visually activated and/or deactivated by each individual user, wherein each user sees only their personal configuration of the layers. Step 806b includes moving, hiding, and resizing individual layers by a single or plurality of participating users. Step 806c includes allowing users to individually move from layer to layer at will, either viewable to the session, or not viewable to the session. And finally, step 806d includes 'remembering' layers (logged) by said servers to render most recent configurations and content individually to users upon rejoining any given session.

Since various possible embodiments might be made of the above invention, and since various changes might be made in the embodiments above set forth, it is to be understood that all matter herein described or shown in the accompanying drawings is to be interpreted as illustrative and not to be considered in a limiting sense. Thus it will be understood by those skilled in the art of creating independent multi-layered virtual workspace applications designed for use with independent multiple input systems that although the preferred and alternate embodiments have been shown and described in accordance with the Patent Statutes, the invention is not limited thereto or thereby.

The figures illustrate the architecture, functionality, and operation of possible implementations of systems, methods and computer program products according to various embodiments of the present invention. It should also be noted that, in some alternative implementations, the functions noted/illustrated may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Some portions of embodiments disclosed are implemented as a program product for use with an embedded processor. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state disk drive, etc.); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-accessible format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The present invention and some of its advantages have been described in detail for some embodiments. It should be understood that although the system and process is described with reference to Multi-User Network-Based Data Systems Analysis, the system and process may be used in other contexts as well. It should also be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, and composition of matter, means, methods and steps described in the specification. A person having ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

The invention claimed is:

1. A computer implemented method comprising:
sending messages into a computer system via at least one of raw input, operating system coding and application specific messaging;
receiving and parsing low level messages by a unique listening application, wherein the unique listening application is further caused to parse the incoming messages into independently handled and rendered independent multiple input data streams;
wherein the unique listening application is comprised in separate distinct layers corresponding to distinct user functionalities;
enabling non co-located users to co-locate within the unique listening application, which enabling comprises acquiring via the listening application, simultaneous users via a networked server;
facilitating user defined navigation between the separate distinct layers to be configured and activated and deactivated by each individual user, such that each configuration and activation is specific to the individual user, wherein such configuration comprises moving, hiding and resizing each of the separate distinct layers by each individual user and providing an option to each of the users to grant access to at least one of an application, tool, or file on said users' desktop by at least one other user and wherein said layers are logged by a server to render a configuration or content logged at any previous time upon at least one user rejoining any given session;
monitoring independent multiple user interface objects and elements for data modification on a first computing device;
generating input data modification information from multiple input data streams via corresponding input generating devices, wherein each of the multiple input data streams are sent or received over a network by each of a corresponding listening second plurality of computing devices, wherein the said generating comprises simultaneously processing a single or plurality of networked independent input data messages, such that the said independent input data messages comprise information on positions and movements of each of the corresponding input generating devices which generate the corresponding input data messages, and states of the multiple independent input device elements in real-time;
sending and receiving data modification information simultaneously, to one or more sending and receiving applications;
receiving input data modification information by a plurality of computing devices; and
replicating said input data modification information on corresponding user-interface elements on said plurality of computing devices.

2. The method of claim 1 further comprising:
generating a plurality of simultaneous and independent input data streams between said first and said plurality of computing devices, which generating further comprises modifying said user interface objects and elements simultaneously and independently.

3. The method of claim 1 wherein said input data may be provided by software, firmware, sensor or other automated device.

4. The method of claim 1 wherein the first computing device accepts input from two or more input devices.

5. A computer system comprising:
a processor;
a non-transitory storage medium coupled to the processor;
encoded instructions stored in the non-transitory storage medium, which when executed by the processor, cause the processor to:
introduce messages into the computer system via at least one of raw input, operating system coding, and application specific messaging;
receive and parse low level messages by a unique listening application;
wherein the unique listening application is comprised in separate distinct layers corresponding to distinct user functionalities;
enable non co-located users to co-locate within the unique listening application, which comprises acquiring via the listening application, simultaneous users via a networked server;
facilitate user defined navigation between the separate distinct layers to be configured and activated and deactivated by each individual user, such that each configuration and activation is specific to the individual user, wherein such configuration comprises moving, hiding and resizing each of the separate distinct layers by each individual user and providing an option to each of the users to grant access to at least one of an application, tool, or file on said users' desktop by at least one other user and wherein said layers are logged by a server to render a configuration or content logged at any previous time upon at least one user rejoining any given session;
monitor independent multiple user interface objects and elements for data modification on a first computing device;
generate input data modification information from multiple input data streams via corresponding input generating devices, wherein each of the multiple input data streams are sent or received over a network by each of a corresponding listening second plurality of computing devices, wherein the said generating comprises simultaneously processing a single or plurality of networked independent input data messages, such that the said independent input data messages comprise information on positions and movements of each of the corresponding input generating devices which generate the corresponding input data messages, and states of the multiple independent input device elements in real-time;
send and receive data modification information simultaneously, to one or more sending and receiving applications;
and
replicate said input data modification information on corresponding user-interface elements on said plurality of computing devices.

6. The system of claim 5 wherein in receiving and parsing low level messages by the unique listening application, the unique listening application is caused to parse the incoming messages into independently handled and rendered independent multiple input data streams.

7. The system of claim 5 further comprising:
a plurality of simultaneous and independent input data streams between said first and said plurality of computing devices, which further comprises modifying said user interface objects and elements simultaneously and independently.

8. The system of claim 5 wherein said input data may be provided by software, firmware, sensor or other automated device.

9. The system of claim 5 wherein the first computing device accepts input from two or more input devices.

10. A computer system comprising:
a processor;
a non-transitory storage medium coupled to the processor;
encoded instructions stored in the non-transitory storage medium, which when executed by the processor, cause the processor to:
send messages into a computer system via at least one of raw input, operating system coding and application specific messaging; receive and parse low level messages by a unique listening application, wherein the unique listening application is further caused to parse the incoming messages into independently handled and rendered independent multiple input data streams; wherein the unique listening application is comprised in separate distinct layers corresponding to distinct user functionalities; enable non co-located users to co-locate within the unique listening application, which enabling comprises acquiring via the listening application, simultaneous users via a networked server;
facilitate user defined navigation between the separate distinct layers, each layer corresponding to distinct user functionality, to be configured and activated and deactivated by each individual non co-located user, such that each configuration and activation is specific to the individual user, wherein such configuration comprises providing an option to each of the users to grant access to at least one of an application, tool, or file on said users' desktop by at least one other user and wherein said layers are logged by a server to render a configuration or content logged at any previous time upon at least one user rejoining any given session;
monitor independent multiple user interface objects and elements for data modification on a first computing device;
generate input data modification information from multiple input data streams via corresponding input generating devices, wherein each of the multiple input data streams are sent or received over a network by each of a corresponding listening second plurality of computing devices, wherein the said generating comprises simultaneously processing a single or plurality of networked independent input data messages, such that the said independent input data messages comprise information on positions and movements of each of the corresponding input generating devices which generate the corresponding input data messages, and states of the multiple independent input device elements in real-time;
send and receive data modification information simultaneously, to one or more sending and receiving applications;
and
replicate said input data modification information on corresponding user-interface elements on said plurality of computing devices.

11. The system of claim 10 wherein in receiving and parsing low level messages by the unique listening application, the unique listening application is caused to parse the incoming messages into independently handled and rendered independent multiple input data streams.

12. The system of claim 10 further comprising:
a plurality of simultaneous and independent input data streams between said first and said plurality of computing devices, which further comprises modifying said user interface objects and elements simultaneously and independently.

13. The system of claim 10 wherein said input data may be provided by software, firmware, sensor or other automated device.

14. The system of claim 10 wherein the first computing device accepts input from two or more input devices.

* * * * *